United States Patent
Briancon et al.

(10) Patent No.: US 7,355,998 B2
(45) Date of Patent: Apr. 8, 2008

(54) SUPPORT FOR MULTIPLE ACCESS POINT SWITCHED BEAM ANTENNAS

(75) Inventors: Alain Charles Louis Briancon, Poolesville, MD (US); Shamim Akbar Rahman, Montreal (CA); Maged Zaki, Pierrefonds (CA)

(73) Assignee: InterDigital Technology Corporation, Wilmington, DE (US)

( * ) Notice: Subject to any disclaimer, the term of this patent is extended or adjusted under 35 U.S.C. 154(b) by 33 days.

(21) Appl. No.: 10/977,452

(22) Filed: Oct. 29, 2004

(65) Prior Publication Data

US 2006/0046730 A1  Mar. 2, 2006

Related U.S. Application Data

(60) Provisional application No. 60/606,303, filed on Sep. 1, 2004.

(51) Int. Cl.
  *H04Q 7/00* (2006.01)
(52) U.S. Cl. ............ 370/328; 370/329; 370/310; 370/312; 370/252; 455/425; 455/424; 455/509; 342/369; 342/373; 342/372
(58) Field of Classification Search ........ 455/425, 455/424; 342/369, 373, 372, 368; 370/310, 370/312, 328, 252
  See application file for complete search history.

(56) References Cited

U.S. PATENT DOCUMENTS

| | | | |
|---|---|---|---|
| 6,269,395 B1 | 7/2001 | Blatherwick et al. | |
| 6,326,926 B1* | 12/2001 | Shoobridge et al. | 343/702 |
| 6,642,887 B2 | 11/2003 | Owechko | |
| 6,731,939 B1* | 5/2004 | Watanabe et al. | 455/450 |
| 6,990,428 B1* | 1/2006 | Kaiser et al. | 702/150 |
| 7,239,894 B2* | 7/2007 | Corbett et al. | 455/562.1 |
| 7,245,921 B2* | 7/2007 | Olvera-Hernandez et al. | 455/452.1 |
| 2001/0024953 A1 | 9/2001 | Balogh | |
| 2002/0022483 A1* | 2/2002 | Thompson et al. | 455/439 |
| 2003/0101239 A1* | 5/2003 | Ishizaki | 709/219 |
| 2003/0195015 A1 | 10/2003 | Fox et al. | |
| 2004/0121749 A1* | 6/2004 | Cui et al. | 455/226.1 |
| 2004/0176024 A1 | 9/2004 | Hsu et al. | |
| 2004/0242235 A1* | 12/2004 | Witana | 455/452.2 |
| 2004/0266427 A1* | 12/2004 | Kurokawa | 455/426.2 |
| 2005/0026616 A1* | 2/2005 | Cavalli et al. | 455/436 |
| 2005/0075142 A1 | 4/2005 | Hoffman et al. | |
| 2005/0088992 A1* | 4/2005 | Bolin et al. | 370/329 |
| 2005/0147023 A1* | 7/2005 | Stephens et al. | 370/203 |
| 2005/0171720 A1* | 8/2005 | Olson et al. | 702/121 |
| 2005/0180345 A1* | 8/2005 | Meier | 370/310 |
| 2005/0255886 A1 | 11/2005 | Aaltonen et al. | |
| 2006/0045056 A1 | 3/2006 | O'Hara, Jr. | |

* cited by examiner

*Primary Examiner*—Rafael Perez-Gutierrez
*Assistant Examiner*—Kwasi Karikari
(74) *Attorney, Agent, or Firm*—Volpe and Koenig, P.C.

(57) ABSTRACT

A plurality of virtual wireless networks are defined. Each of the plurality of virtual wireless networks has a different set of requirements. A node is capable of producing a plurality of antenna beams or patterns. Each virtual wireless network is associated with a unique group of the antenna beams or patterns. Users of each of the virtual wireless networks communicate using the antenna beams or patterns associated with that virtual wireless network.

4 Claims, 4 Drawing Sheets

US 7,355,998 B2

SUPPORT FOR MULTIPLE ACCESS POINT SWITCHED BEAM ANTENNAS

CROSS REFERENCE TO RELATED APPLICATION(S)

This application claims the benefit of U.S. provisional application No. 60/606,303, filed Sep. 1, 2004, which is incorporated by reference as if fully set forth.

FIELD OF INVENTION

The invention generally relates to wireless communication systems. In particular, the invention relates to implementing multiple networks over common equipment.

BACKGROUND

As illustrated in FIG. 1, as the demand for wireless services grows, multiple wireless networks may operate in a common area. FIG. 1 is an illustration of multiple wireless networks operating in a common area, such as in a University environment. One network $10_1$ (illustrated by a mixed dash and dotted line) is for faculty and administrators. A second network $10_2$ (illustrated by a dashed line) is for students. A third network $10_3$ (illustrated by a dotted line) is for facilities and security and a fourth network $10_4$ (illustrated by a solid line) is for guests and visitors. Each of these networks $10_1$, $10_2$, $10_3$, $10_4$ (10) may have different requirements, such as quality of service (QoS) and security.

These networks 10 overlap as illustrated in FIG. 1. In area $12_1$, all four networks are present. In other areas $12_2$ and $12_3$, two of the networks are present. To reduce the costs of implementing multiple networks in a common network area, common equipment (hardware and software) can be used to implement these networks.

FIG. 2 is an illustration of an access point (AP) 14 running multiple 802.11 type wireless networks. The access point 14 and the wireless transmit/receive units (WTRUs) $16_1$, $16_2$, $16_3$, $16_4$ (16) in the AP's effective operating area form a basic service set (BSS) 18. As illustrated, the BSS 18 has an associated BSS identification 1 (BSSID 1) code of "AA:AA:AA:AA:AA:AA". The AP 14 is also supporting four (4) virtual wireless local area networks (V-WLANs) 12, V-WLAN 1 $12_1$ (faculty and administrators), V-WLAN 2 $12_2$ (students), V-WLAN 3 $12_3$ (facilities and security) and V-WLAN 4 $12_4$ (guests and visitors). Each V-WLAN 12 has an associated extension service set (ESS) linking the AP's portion of the V-WLAN 12, such as by layer 2, to other APs' portions of the V-WLAN 12. Each ESS has an associated ID, ESSID 1, ESSID 2, ESSID 3 and ESSID 4. The presentation of each of the multiple V-WLANs to the WTRUs 16 by the AP 14 can be referred to as a virtual AP (VAP). The use of VAPs reduces the number of physical APs 14 that are needed to implement multiple networks and allows for reduced interference and collisions.

Although the ESSIDs provide some segregation between the V-WLANs 12, different service requirements, such as QoS, are not readily segregated by ESSID. Accordingly, it is desirable to have alternate approaches for segregating (virtual) networks.

SUMMARY

A plurality of virtual wireless networks are defined. Each of the plurality of virtual wireless networks has a different set of requirements. A node is capable of producing a plurality of antenna beams. Each virtual wireless network is associated with a unique group of the antenna beams. Users of each of the virtual wireless networks communicate using the antenna beams associated with that virtual wireless network.

BRIEF DESCRIPTION OF THE DRAWING(S)

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, station (STA), mobile station, fixed or mobile subscriber unit, pager, or any other type of device capable of operating in a wireless environment. When referred to hereafter, an access point (AP) includes but is not limited to a base station, Node-B, site controller, WLAN access point or any other type of interfacing device in a wireless environment.

Figure 1:
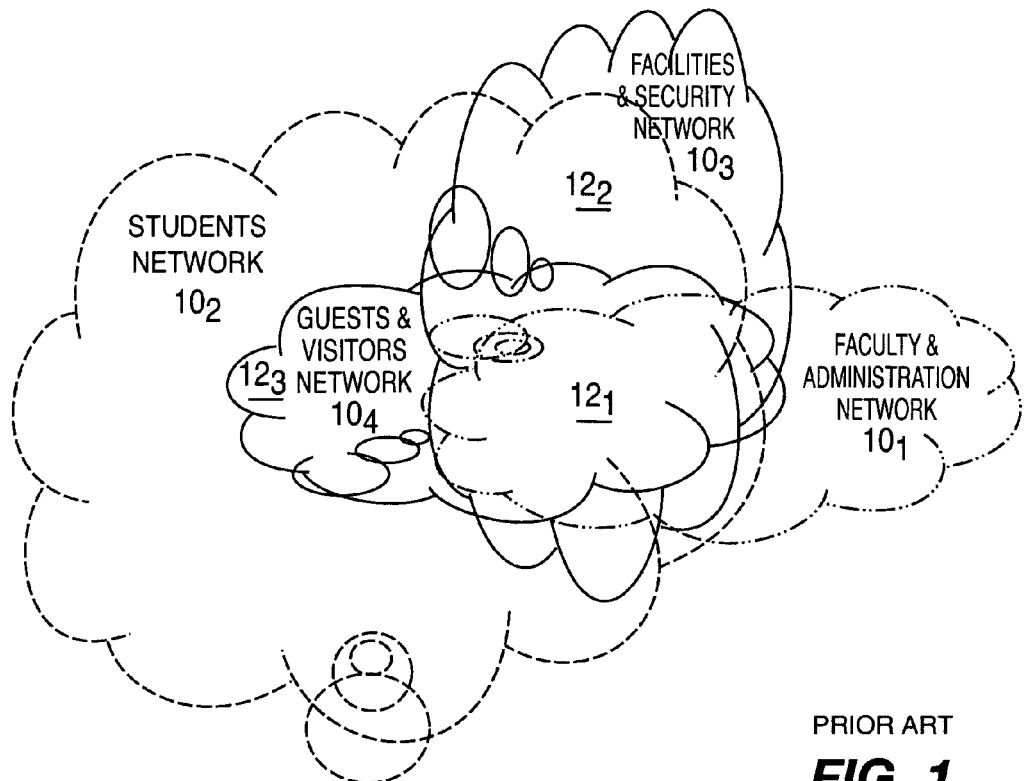
FIG. 1 is an illustration of multiple overlapping wireless networks.
Figure 2:
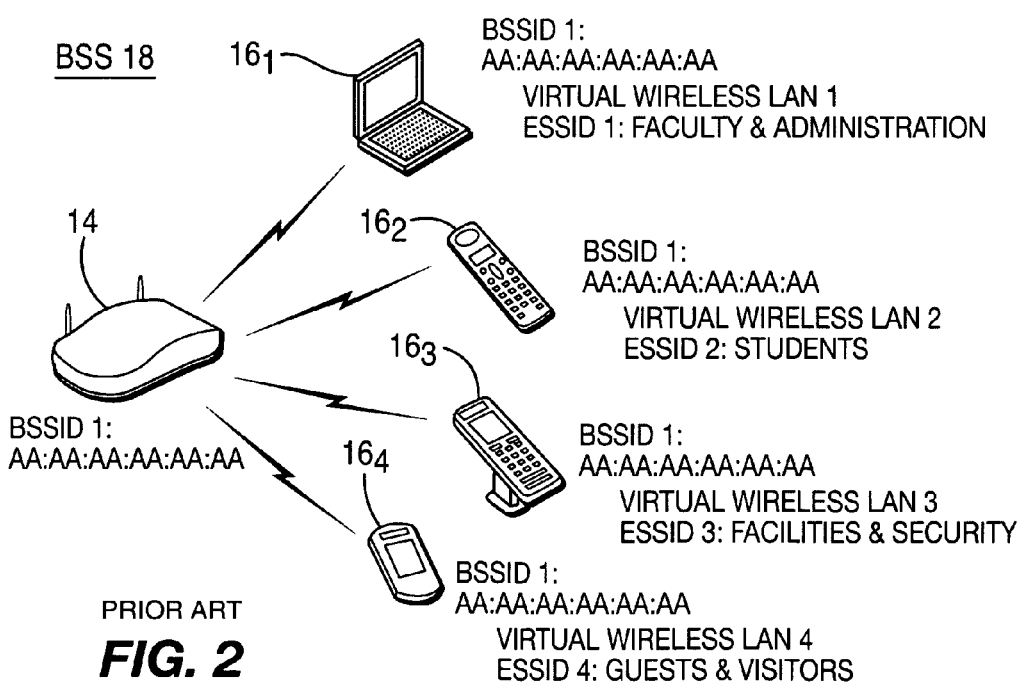
FIG. 2 is an illustration of an access point supporting multiple V-WLANs.
Figure 3:
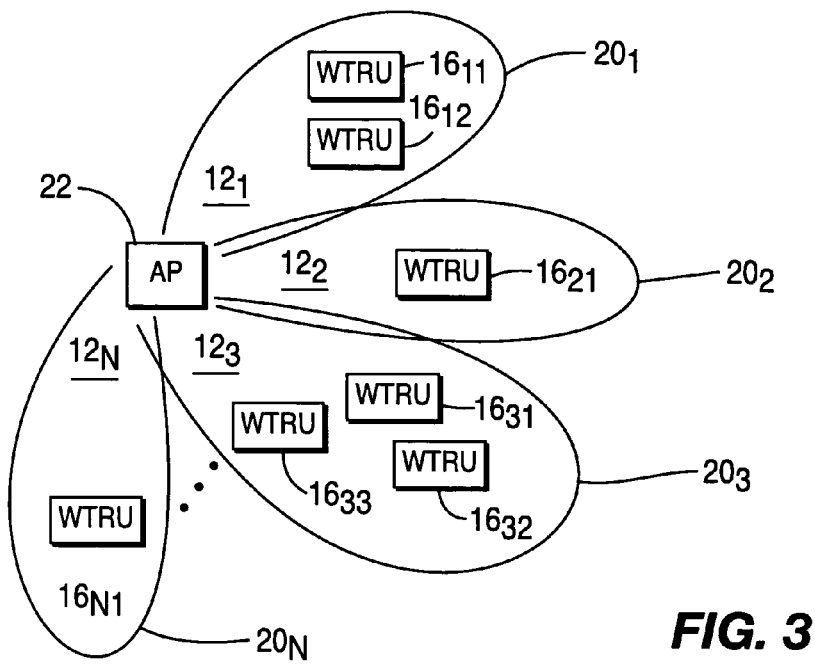
FIG. 3 is an illustration of virtual wireless network segregation using antenna beams or patterns.

FIG. 3 is an illustration of virtual wireless network segregation using antenna beams or patterns. In this context, a pattern is a rapidly changing beam. Typically, the beam changes faster than most transmitter signal transitions. As illustrated in FIG. 3, one AP 22 supports N virtual wireless networks $12_1$ to $12_N$. A virtual wireless network may include a virtual cellular network, V-WLAN, virtual wireless wide area network, virtual Bluetooth network, among others. Each virtual wireless network has one (as illustrated) or multiple antenna beams or patterns, $20_1$ to $20_N$ (20), such as switched beams or patterns. As a result, WTRUs $16_{11}$, $16_{12}$, … $16_{N1}$ (16) within each virtual wireless network are segregated by that virtual network's associated antenna beam(s) or pattern(s) 20. To illustrate, WTRU $16_{21}$ of virtual wireless network $12_2$ is in a separate antenna beam $20_2$ than WTRU $16_{31}$, $16_{32}$ and $16_{33}$ of beam $20_3$ of virtual network $12_3$. The segregation of the virtual wireless networks more readily facilitates: different QoSs, different air interfaces (such as IEEE 802.11b, 802.11g, 802.11k, 802.11n and 802.11e), different data types (such as voice and data), differentiate between providers/provider services/provider coverage areas, different WTRU behaviors (such as signal to noise ratio (SNR) thresholds, smart antenna/no smart antenna and power control), and differentiate between modulation, MAC framing and rate control between virtual wireless networks.

The beams or patterns 20 utilized for segregating the networks may be dynamic or fixed beams or patterns. When dynamic beams or patterns are used, the beams or patterns are preferably allocated by efficiently grouping WTRUs 16 within the same virtual network 12 within the same beams or patterns, such as illustrated in FIG. 3. However, due to their physical proximity, it may be necessary to use multiple beams or patterns for one virtual network 12. To illustrate, if WTRU $16_{21}$ and WTRU $16_{N1}$ were in the same network, two beams or patterns $20_2$ and $20_N$ may be used for that virtual network 12. If a fixed beam deployment is used, each virtual network 12 has one or multiple of the fixed beams or patterns associated with it. The beams or patterns associated with each network 12 is based on the WTRUs' locations with respect to the beams or patterns. Additionally, a combination of fixed and dynamic beams or patterns may be used for virtual network segregation.

The beams and patterns may also be manipulated in elevation. This allows for separation of users based on their elevation differences as well as distance from the AP 22. To illustrate, multiple omni-direction transmissions (with respect to the azimuth) may have a varying elevation or vertical displacement. Since the vertically displaced beams encounter the ground at different point, where the transmissions are absorbed or scattered, each omni-directional beam can have an associated distance. Furthermore, the elevation differences can be used for differing shaped beams in the azimuth, such as a single primary lobe, multiple lobes or other shapes. In general all the shaping that can be done in the azimuth plane, can also be done in the elevation plane. The overall characterizing of the patterns may be considered as being defined in three dimensions.

Figure 4:
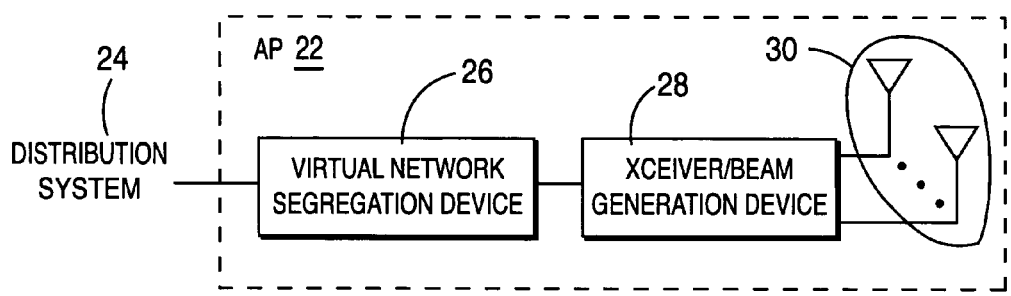
FIG. 4 is a simplified block diagram of an embodiment of an AP using virtual wireless network segregation using antenna beams or patterns.

FIG. 4 is a simplified block diagram of an embodiment of an AP 22 capable of virtual network beams or patterns segregation. The AP 22 receives and sends wireless network messages using a distribution system 24 or in a cellular system, the cellular network. A virtual network segregation device 26 is utilized to segregate data between the virtual networks 12. A transceiver (Xceiver)/beam generation device 26 is used to produce the virtual network beams or patterns by an antenna array 30 and transfer the data to/from each WTRU 16. Broadcast messages may be sent in each beam or in an omni-directional manner. The components of FIG. 4 may be implemented using a single integrated circuit (IC), such as an application specific integrated circuit (ASIC), multiple ICs, discrete components or a combination of IC(s) and discrete components.

Figure 5:
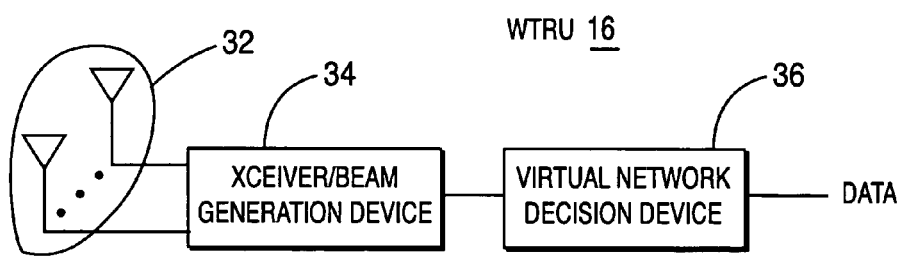
FIG. 5 is a simplified block diagram of an embodiment of a WTRU using virtual wireless network segregation using antenna beams or patterns.

FIG. 5 is a simplified block diagram of an embodiment of a WTRU 16 capable of operating over different virtual networks. The WTRU 16 has an antenna or antenna array 32 for receiving or transmitting virtual network messages. A Xceiver 34 is used to in receiving and transmitting the messages. If the WTRU 16 employs smart antenna, a beam generation device 34 is also used in conjunction with receiving and/or transmitting messages. A virtual network decision device 36 is used to recover data from a virtual network 12 or multiple virtual networks 12 associated with the WTRU 16. The WTRU 16 may also be used in an ad hoc mode to extend the range of the virtual network 12. The WTRU 16 may operate to transfer messages from/to the AP 16 and another WTRU 16 or between WTRUs 16. The components of FIG. 5 may be implemented using a single integrated circuit (IC), such as an application specific integrated circuit (ASIC), multiple ICs, discrete components or a combination of IC(s) and discrete components.

One approach to applying virtual wireless network segregation using antenna beams or patterns is in a WLAN type environment. In addition to segregating V-WLANs by ESSID, antenna beams or patterns (transmit power and antenna pattern) are used to segregate the V-WLANS. To illustrate, an ESSID 1 may be an IEEE 802.11b based V-WLAN and ESSID 2 may be an IEEE 802.11g based V-WLAN. If the WTRUs within these V-WLANs are separated, directed beams or patterns can be used to separate the users and improve the capacity of the cell. If users are in close physical proximity, a beam may support multiple V-WLANs distinguished by ESSID.

In such an implementation, each V-WLAN may be used to send broadcast information to its users or the AP may broadcast such information to all the users of the V-WLANs that it supports, such as by using an omni-direction transmission.

Due to the V-WLAN segregation, radio resource management (RRM) may be handled on each V-WLAN by its VAP separately from other V-WLANs. A master RRM can be used to handle RRM between the V-WLANS. Alternately, RRM may be handled jointly between VAPs. Additionally, as WTRUs move, the V-WLAN beams or patterns may need to be changed. To illustrate, the beam shaping/steering parameters may change to cover the moving WTRU. Additionally, the moving WTRU may be handled by a V-WLAN handover. One approach to handoff between V-WLANs uses internal inter access point protocol (IAPP) between VAPs/V-WLANs. Although each access point is primarily described above as being separate, multiple physical APs may be used to form one VAP supporting a larger portion or an entire V-WLAN.

Figure 6:
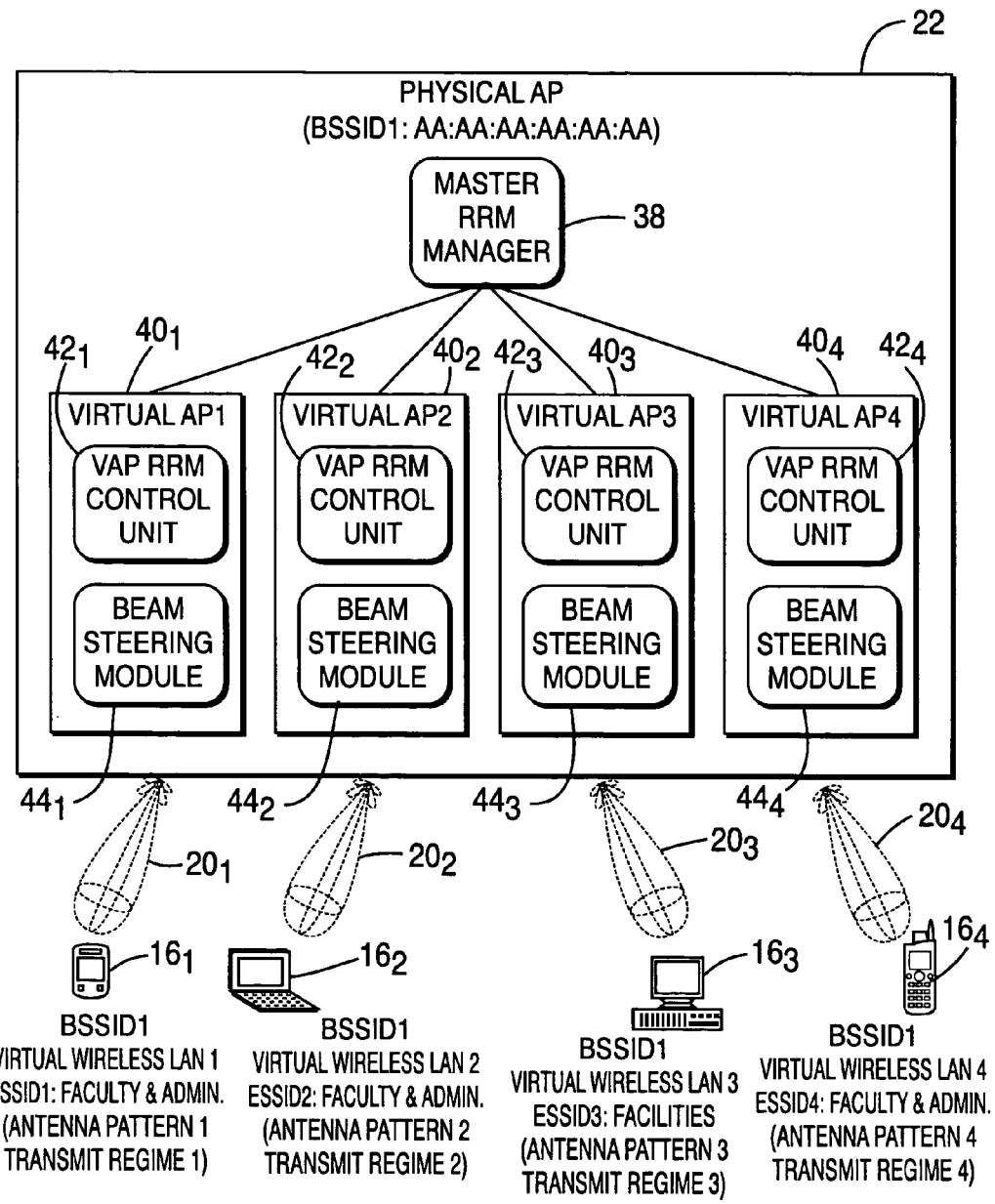
FIG. 6 is an illustration of a radio resource management (RRM) embodiment using virtual wireless network segregation using antenna beams or patterns.

FIG. 6 is an illustration of an AP 22 using a master RRM 38 and a RRM $42_1$, $42_2$, $42_3$ and $42_4$ (42) for each VAP $40_1$, $40_2$, $40_3$ and $40_4$ (40). As illustrated in FIG. 6, four VAPs 40 are controlled by one physical AP 22. Each VAP 40 has its own SSID, such as a unique ESSID. At least one WTRU 16 communicates over a respective antenna beam or pattern 20 of each VAP 40. The beam/pattern 20 is produced by a beam steering module $44_1$, $44_2$, $44_3$ and $44_4$ (44) in response to the RRM control unit $42_1$, $42_2$, $42_3$ and $42_4$ (42) of each VAP 40. The VAP RRM control unit 42 controls the radio resources for its VAP 40 under the direction of the master RRM manager 38. The master RRM manager 38 of the AP 22 controls the radio resources over all the VAPs 40 of the AP 22. The RRM manager 38 coordinates between the VAPs 40 and configures each VAP 40 to serve a specific service provider or service.

The configuration of FIG. 6 allows for partitioning one physical AP 22 into multiple VAPs 40, which facilitates optimization of the beam steering/pattern algorithm for each VAP based on service requirements, devices supported features/version of standards and wireless medium conditions. Based on these criteria among others, the beam steering/pattern algorithm can be optimized to change transmit and receiver characteristics (power and antenna pattern) according to the ESSID of each VAP 40.

Figure 7:
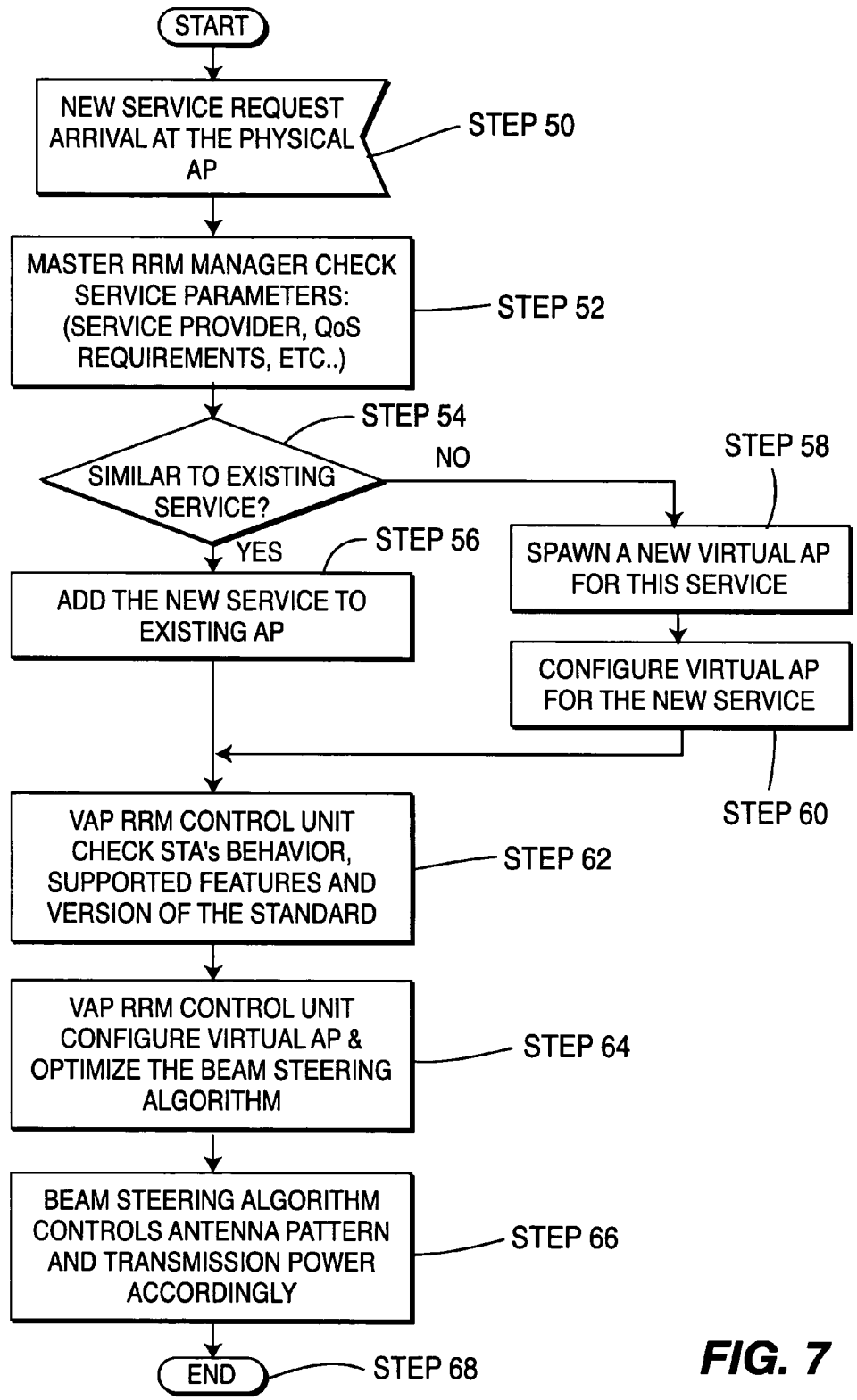
FIG. 7 is a flow chart for an embodiment for handling a new service request.

FIG. 7 is a flow diagram for adding a new service using VAPs 40, such as in FIG. 6. A new service request arrives at the physical layer, step 50. The request is directed to the master RRM manager 38 in the AP 22. The master RRM manager 38 checks the service parameters, such as service provider, QoS requirements, standard/version of standard, etc., step 52. The master RRM manager 38 checks to see if the service request can be served by an existing VAP 40 or whether a new VAP 40 is necessary, step 54. If an existing VAP 40 can serve the request and satisfy its service parameters, the service is added to the existing VAP 40, step 56. If no existing AP is able to serve the new request, the master RRM manager 38 spawns a new VAP 40, step 58, and passes the service parameters to the new VAP 40, step 60.

The VAP control unit 42 of either the existing or new VAP 40 checks other parameters, such as the station's behavior, features and standard version, step 62. The VAP 40 is configured by the VAP RRM control unit 42 with the appropriate MAC framing, rate control scheme, modulation and optimize the beam steering algorithm to satisfy service and station characteristics, step 64. The beam steering module 44 runs an optimized beam steering algorithm to control antenna pattern and transmission power, step 68.

What is claimed is:

1. A method for adding a new service to a basic service set, the method comprising:
   receiving at a physical access point (AP) a request for the new service;
   analyzing the service parameters of the new service;
   based upon the analysis, determining whether the new service can be supported by one of a plurality of existing virtual access points, each virtual access point being associated with different antenna beams or pattern;
   based on the determination, adding the new service to a selected one of the existing virtual access points for a new service that can by supported by one of the plurality of existing virtual access points;
   creating a new virtual access point for the new service for a new service that cannot be supported by one of the plurality of existing virtual access points;
   configuring a new virtual access point's characteristics wherein the new virtual access point characteristics are selected from the group consisting of: MAC framing, rate control scheme and modulation;
   passing service parameters of the new service to the new virtual access point; and
   configuring the selected one of the existing virtual access points or the new virtual access point to optimize a beam steering or pattern algorithm wherein the beam steering or pattern algorithm controls the antenna pattern and transmission power.

2. The method of claim 1 further comprising a radio resource management control unit of the selected one of the existing virtual access points or the new virtual access point checking station behavior, supported features and version of the standard for wireless transmit receive units of the new service.

3. The method of claim 2 wherein the determining whether the new service can be supported by one of the existing virtual access points and the adding or the creating is controlled by a master radio resource manager of the access point.

4. The method of claim 1 wherein the service parameters of the new service are selected from the group consisting of: the service provider, quality of service (QoS) requirements, and version of the standard.

* * * * *

UNITED STATES PATENT AND TRADEMARK OFFICE
CERTIFICATE OF CORRECTION

PATENT NO. : 7,355,998 B2 Page 1 of 1
APPLICATION NO. : 10/977452
DATED : April 8, 2008
INVENTOR(S) : Briancon et al.

It is certified that error appears in the above-identified patent and that said Letters Patent is hereby corrected as shown below:

IN THE SPECIFICATION

At column 3, line 29, after the word "different", delete "point" and insert therefor --points--.

At column 3, line 58, before the word "receiving", delete "to in" and insert therefor --for--.

Signed and Sealed this

Eighth Day of July, 2008

JON W. DUDAS
*Director of the United States Patent and Trademark Office*